United States Patent [19]

Orino et al.

[11] Patent Number: 5,210,645

[45] Date of Patent: May 11, 1993

[54] LIGHT BLOCKING DEVICE FOR OPTICAL LENSES

[75] Inventors: Kanjo Orino, Kawasaki; Shigeru Oshima, Yokohama, both of Japan

[73] Assignee: Canon Kabushiki Kaisha, Tokyo, Japan

[21] Appl. No.: 673,454

[22] Filed: Mar. 22, 1991

[30] Foreign Application Priority Data

Mar. 24, 1990 [JP] Japan ..................... 2-74789

[51] Int. Cl.⁵ .......................................... G02B 9/00
[52] U.S. Cl. ............................ 359/738; 359/601; 359/611
[58] Field of Search ............... 359/236, 229, 601, 609, 359/611, 613, 614, 798, 799, 800, 885, 894, 738

[56] References Cited

U.S. PATENT DOCUMENTS 3,715,149  2/1973  Freeland ..................... 359/611
4,810,076  3/1989  Murao et al. ................ 359/611

FOREIGN PATENT DOCUMENTS 62-139514  6/1987  Japan .
62-139518  6/1987  Japan .

Primary Examiner—Loha Ben
Attorney, Agent, or Firm—Fitzpatrick, Cella, Harper & Scinto

[57] ABSTRACT

This is to disclose an optical apparatus, comprising a plurality of optical lenses; and a plurality of light blocking plates or blocking member arranged in the direction of the optical axis for blocking harmful sagittal peripheral rays, the light blocking plates being installed in a ring shape at the pupil position of the optical lenses and being inclined, by an angle $\alpha$ respectively, to a plurality of imaginary planes including the optical axis.

13 Claims, 11 Drawing Sheets

| ΔY OF TANGENTIAL LIGHT | | ΔZ OF SAGITTAL LIGHT |
|---|---|---|
|  | $\omega_4$ |  |
|  | $\omega_3$ |  |
|  | $\omega_2$ |  |

$\omega_1 (=0)$

LIGHT BLOCKING DEVICE FOR OPTICAL LENSES

BACKGROUND OF THE INVENTION

1. Field of the Invention

This invention relates to a light blocking device of such a shape that it can effectively block, out off-axis fluxes passing through a photographing system, both a sagittal peripheral light flux at a given field angle and a tangential peripheral flux at an intermediate field angle, particularly when installed in a portion of the photographing system. The invention is suitable for such photographing systems as used in photo-taking cameras, video cameras and television cameras, and such projection lenses as used in projectors.

2. Related Background Art

The further toward the peripheral area of a field, the more the optical performance of a photographing system or projection lenses generally deteriorates.

Especially in a photographing system having a larger diameter and a wider field angle, the deterioration of the off-axis aberration becomes larger because the optical performance around the peripheral of the field tends to drop significantly.

In order to improve the peripheral optical performance of the field of a photographing system, one or more apertures having a ring-shaped opening, referred to as flare stops herein, are conventionally installed in a portion of the photographing system so that off-axis light fluxes can be partly blocked.

Figure 3:
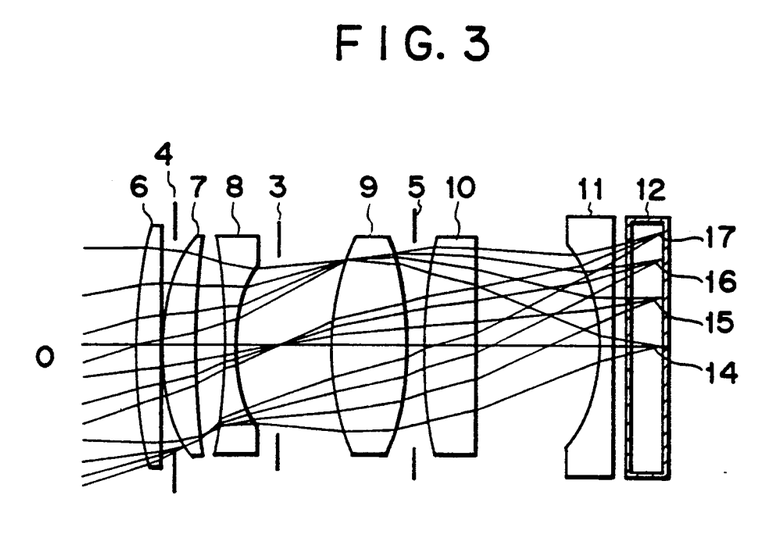
FIG. 3 is a cross-sectional view of projection lenses for a video projector to which the light blocking device under this invention is applied.

FIG. 3 is an outlined sketch showing a conventional example where a flare stop is installed in a portion within a set of projection lenses for a video projector so that off-axis fluxes can be blocked.

Figure 4:
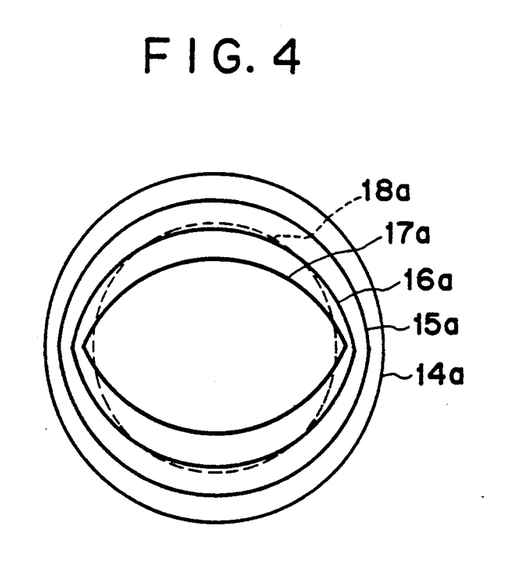
FIG. 4 is an explanatory view showing a state of peripheral fluxes being blocked when a conventional flare stop is used.

In the photographing field of the figure thereof, the fluxes to be imaged at the point 14 on the axis and at the points 15, 16 and 17 off the axis are the ones within the areas 14a, 15a, 16a and 17a indicated in FIG. 4, respectively. Thus, when a flare stop is installed at the point 3 in FIG. 3, the flux to be blocked by the flare stop will be outside from the area covered by a dotted line 18a in FIG. 4.

Figure 5:
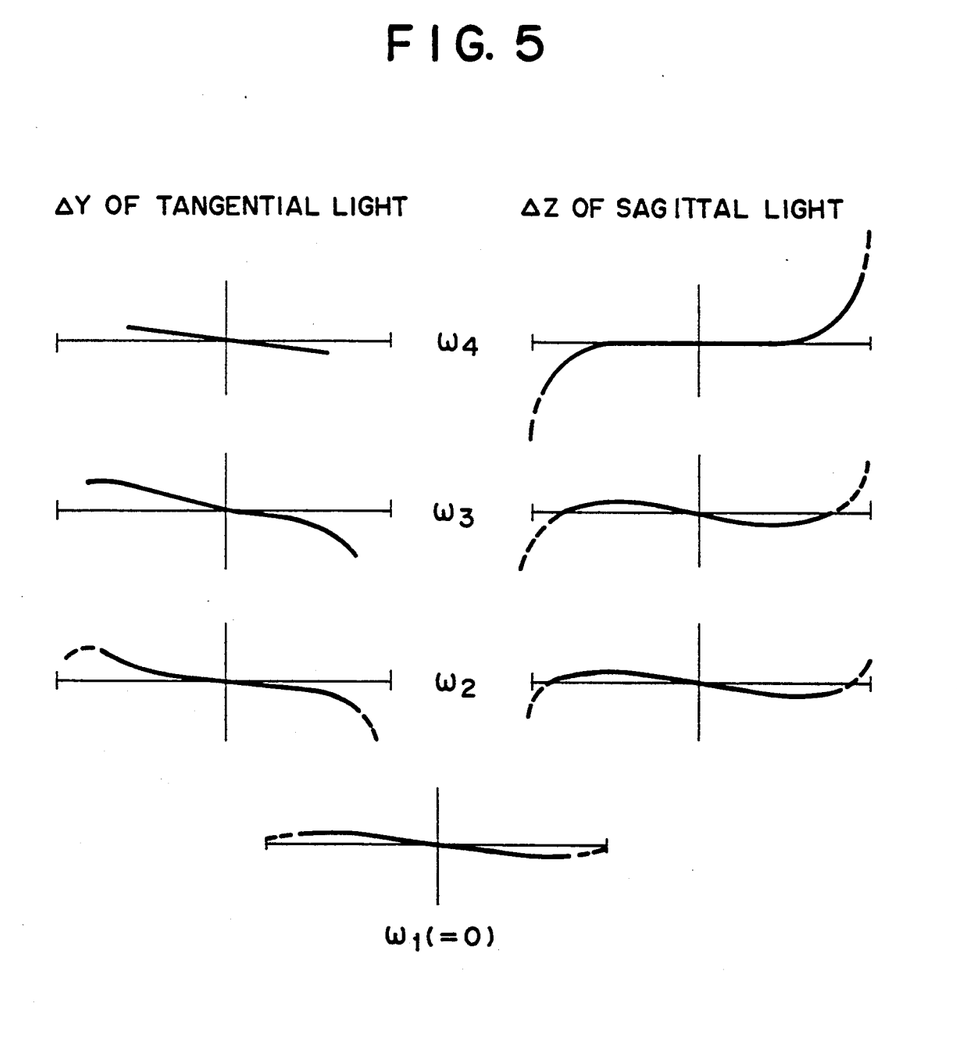
FIG. 5 shows the aberration curves of the projection lenses in FIG. 3.

In this case, a part of the off-axis fluxes is blocked, but at the same time as indicated in FIG. 5, the on-axis flux (field angle $\omega=0°$) as well as an off-axis flux at a narrow field angle ($\omega=\omega^2$) are also blocked. This drawback causes a problem that the phototaking system becomes dark as a result of an increase in the F number.

When a flare stop is installed at the point 5 in FIG. 3 where the on-axis flux is not blocked, off-axis fluxes, for example, around the peripheral of the field other than the aimed off-axis fluxes are also blocked, thus inconveniently decreasing the light amount to a great extent.

In Japanese Laid-Open Patent Application Nos. 62-139514~139518, a light blocking plate to prevent sagittal flares is disclosed, but this plate has a great difference in light amount between the on-axis and off-axis fluxes.

SUMMARY OF THE INVENTION

This invention is intended to provide a light blocking device or photo-taking lenses using thereof that can effectively block aimed fluxes without greatly affecting the F number of a photographing system. It also is intended to prevent a drop in the light amount of peripheral fluxes by means of appropriately setting a structure of a flare stop to be installed in a portion of a photographing system.

This invention is still further intended to provide a light blocking device suitable for such photographing systems as photo-taking cameras and video cameras as well as for projection lenses that can attain a high optical performance over the whole area of the field.

DESCRIPTION OF THE PREFERRED EMBODIMENTS

Figure 1:
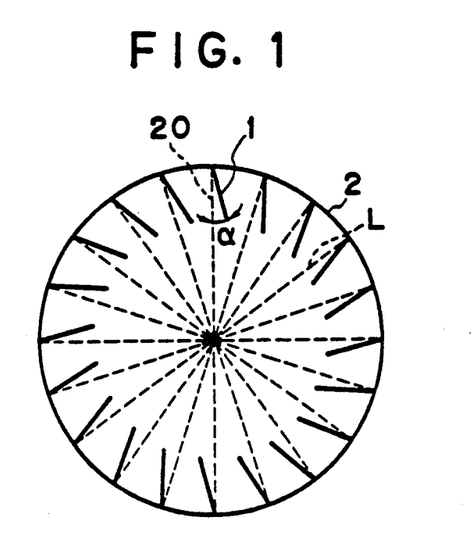
FIG. 1 shows a cross-sectional view of a critical portion of the first embodiment of this invention.
Figure 2:
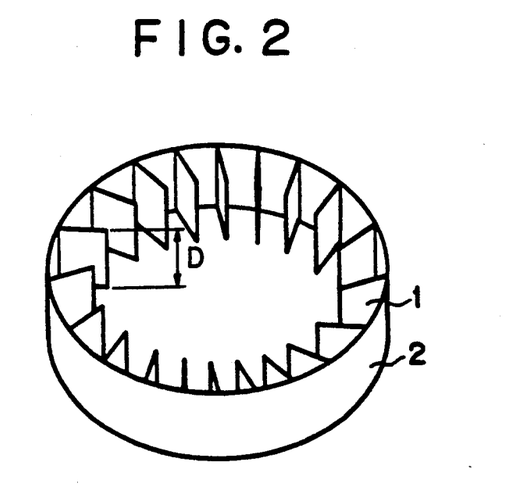
FIG. 2 is a cross view of FIG. 1.

FIG. 1 is a cross-sectional view of a critical portion of alight blocking device under the first embodiment of this invention. FIG. 2 is a cross view of the light blocking device in FIG. 1.

In the figures thereof, 1 is a light blocking plate, and is inclinedly installed in a photographing system at a given angle $\alpha$ against a plane 20 including the optical axis of the photographing system.

The light blocking plate 1 is made of a thin, quadrilateral metallic plate, and as shown in the above figures, a plurality of light blocking plates 1 are radially installed in a ring shape at a roughly equal space, so that a line connecting the inside of each blocking plate forms rough equilateral polygon.

Reference numeral 2 is a supporting member comprising a cylindrical shape and supporting a plurality of blocking plates 1.

A block coloured light-absorbing layer is provided on the surface of the light blocking plates 1 and the inside wall of the supporting member 2 so that light reflection can be prevented.

In the embodiment hereof, a plurality of light blocking plates 1 are installed as shown in the figures thereof, and are supported by a supporting member 2 to form a light blocking device.

Figure 6:
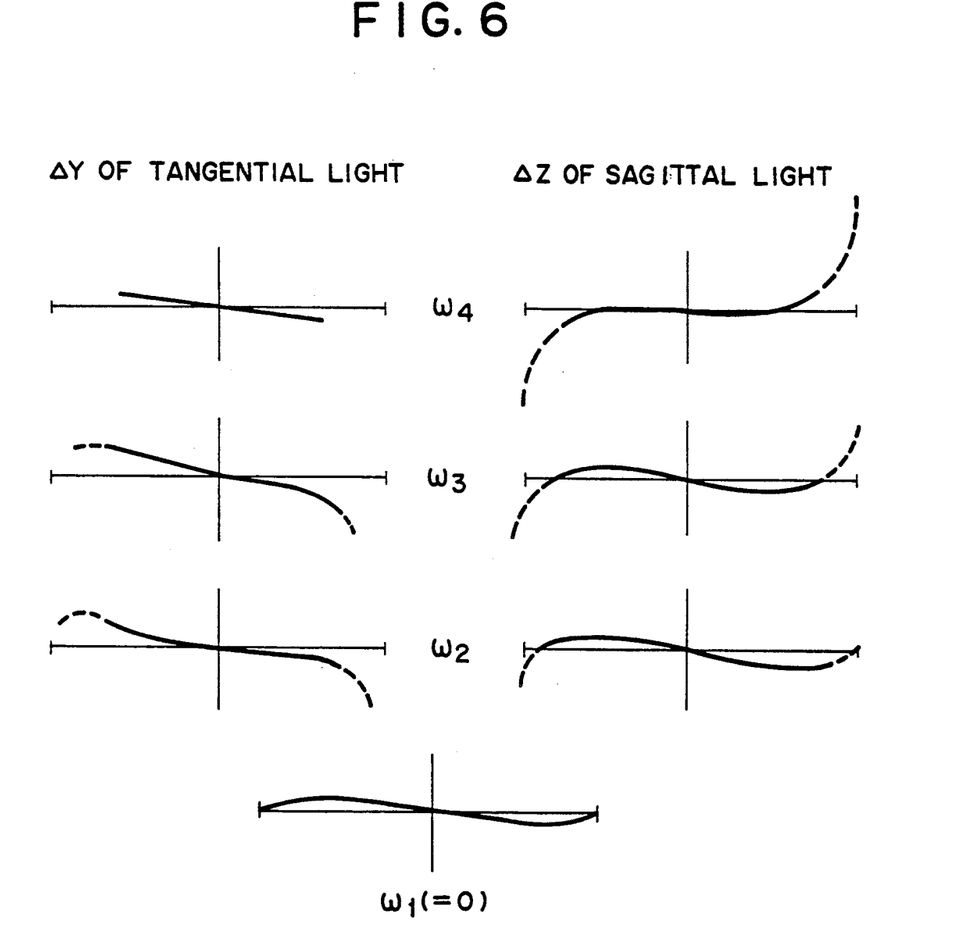
FIG. 6 is an explanatory view showing a state of fluxes to be blocked in aberration curves when the light blocking device in FIG. 1 is used.

FIG. 6 is an explanatory view showing transverse aberration when the light blocking device relating to the embodiment hereof is so installed at point 3, namely the pupil position, in the optical system of projection lenses shown in FIG. 3 for video projectors that the center axis of a cylindrical supporting member 2 aligns with the optical axis 0.

In the figure thereof, the abscissa represents pupil coordinates, and the ordinate, the transverse aberration amounts ΔY, ΔZ respectively on the Gaussian imaging plane.

The half field angle ω of the photographing field angle is in the following order: $\omega^1=(=0)<\omega^2<\omega^3<\omega^4$ $\omega^1=0$ indicates a state of being on the axis, namely the center of the field. In the figure thereof, at the half field angle $\omega=\omega^2$, $\omega^3$, the aberration of a tangential peripheral ray of the projection lenses is extremely large, and also at $\omega=\omega^3$, $\omega^4$, the aberration of sagittal peripheral ray is extremely large.

In the embodiment hereof, the fluxes in the area corresponding to an aberration curve indicated in the dotted line in the figure thereof are blocked by means of the light blocking device indicated in FIG. 1, installed at a predetermined position, whereby the optical performance around the peripheral of the field is improved. Namely, tangential peripheral fluxes block a part of the field angle $\omega=\omega^2$, $\omega^3$, and sagittal peripheral fluxes block a part of the field angle $\omega=\omega^3$, $\omega^4$.

The optical functions of the light blocking device under this embodiment will be described hereinafter.

The light blocking device under this embodiment comprises 20 light blocking plates as a whole which are arranged as indicated in FIG. 1.

Where L is the longest distance from the optical axis 0 to one of the off-axis fluxes to be preferably blocked; D is the length of a light blocking plate 1 along the optical axis 0 at the position thereof; ω is an angle at which the principal ray of the sagittal rays to be preferably blocked crosses the optical axis; and N is the number of the light blocking plates, an apparent length between two neighboring light blocking plates, at the longest distance from the optical axis of the sagittal rays, is approximately $2L \sin(\pi/N) \cdot \cos \omega$. On the other hand, since an apparent length in the direction of the optical axis to be blocked by a blocking plate 1 is D tan ω, the following equation can be established:

$$D \tan \omega = 2L \sin(\pi/N) \cos \omega$$

Thus, in this embodiment, a blocking plate 1 is made in a quadrilateral shape, and is so constructed that a length D satisfies:

$$D > 2L \sin(\pi/N) \cdot \cos \omega / \tan \omega$$

As a result, out of off-axis fluxes, mainly a part of sagittal peripheral fluxes at a field angle $\omega=\omega^3$, $\omega^4$ and a part of transverse peripheral fluxes at a field angle $\omega=\omega^2$, $\omega^3$ are blocked.

Also in this embodiment, out of off-axis peripheral rays, a part of transverse peripheral rays and a part of sagittal peripheral rays are blocked as indicated by intermediate field angles $\omega^2$ and $\omega^3$ in FIG. 6. In this case, fluxes are selectively blocked by appropriately changing the angle α of the light blocking plate indicated in FIG. 1 depending upon the extent of the deterioration of either tangential or sagittal peripheral rays at field angles of $\omega^2$ and $\omega^3$. Generally, the angle α should be preferably in an approximate range of $5°<\alpha<45°$.

In the embodiment hereof, the light blocking device in FIG. 1 can block sagittal peripheral fluxes without blocking the tangential peripheral fluxes at the maximum field angle $\omega^4$ indicated in FIG. 6. Thus a flux having the largest aberration amount is effectively blocked while preventing the decreasing of the peripheral light amount of the maximum field angle $\omega^4$.

Also, in the embodiment hereof, since rays corresponding to the on-axis flux are almost in parallel with the optical axis as indicated in FIG. 4, the portion to be blocked by the light blocking plates in the structure thereof is only equal to the thickness of each light blocking plate. As a result thereof, decrease of the light amount is small enough to keep the original brightness of the projection lenses without causing almost any adverse effect to the transverse aberration on the axis at $\omega^1=0$ in FIG. 6.

In this embodiment, a light blocking device is installed at the point 3 in the lens system indicated in FIG. 3 (where off-axis fluxes cross the optical axis), and more effective light blocking can be done by appropriately arranging the light blocking device depending on the aberration of tangential peripheral rays.

When the aberration of the upper rays of tangential peripheral rays at intermediate field angles $\omega^2$ and $\omega^3$, for example, is large, it is preferable to locate the light blocking device toward the right side from the point 3 in FIG. 3 because the upper rays having larger aberrations can be selectively blocked.

Figure 7:
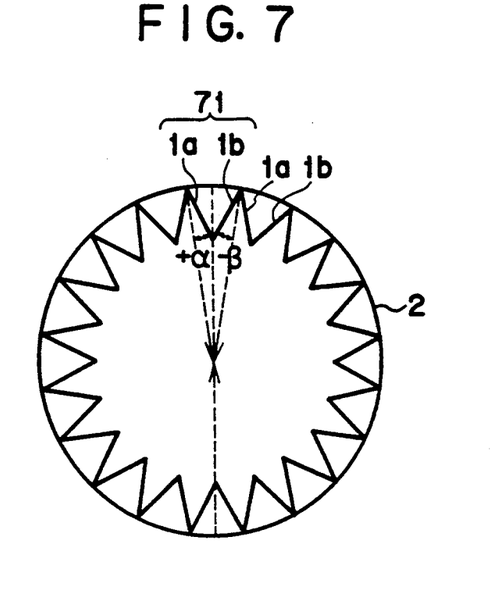
FIG. 7 is a cross-sectional view of a critical portion of the second embodiment of this invention.
Figure 8:
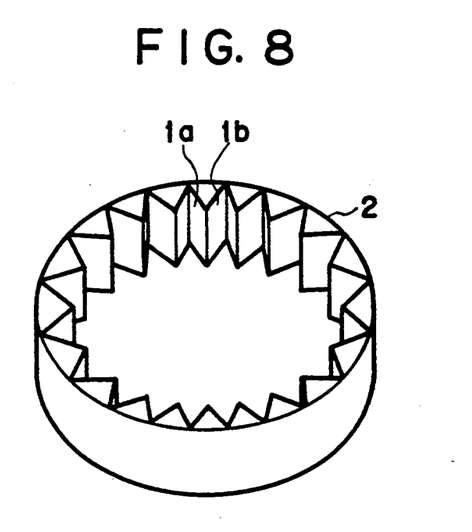
FIG. 8 is a cross view of FIG. 7.

FIG. 7 is a cross-sectional view of a critical portion of a light blocking device under the second embodiment of this invention, and FIG. 8 is a cross view of the light blocking device in FIG. 7.

This embodiment comprises a plurality of light blocking members 71 arranged in a ring shape at a roughly equal space, consisting of the light blocking plate 1a inclined by angle α and the roof-shaped light blocking plate 1b inclined by an angle −β, respectively to a plane including the optical axis of a photographing system when installed in the system.

Then, α may be equal to β, but α does not have to be equal to β.

The off-axis fluxes blocking performance when the light blocking device under the embodiment hereof is installed in a portion of a photographing system, is basically about the same as that of the first embodiment in FIG. 1.

In the light blocking device indicated in FIG. 1, off-axis fluxes passing therethrough are asymmetrically blocked in the tangential cross section and the sagittal cross section, but in this embodiment, off-axis fluxes are blocked symmetrically in the tangential cross section and the sagittal cross section, whereby aimed off-axis fluxes can be more effectively blocked.

In each of aforesaid embodiments, the shape of each light blocking plate is quadrilateral, but properly setting aforesaid angles α and β can effectively block off-axis light fluxes according to each shape of the blocking plates even if a blocking plate in such as an oval, ellipsoidal or triangular shape is used. Also, the blocking plates or blocking members can be arranged at a roughly equal space, and the purposes of this invention can be achieved even if these plates or members are arranged at slightly different spaces.

Further, other embodiments will be described in FIG. 9 and the following figures.

Figure 9:
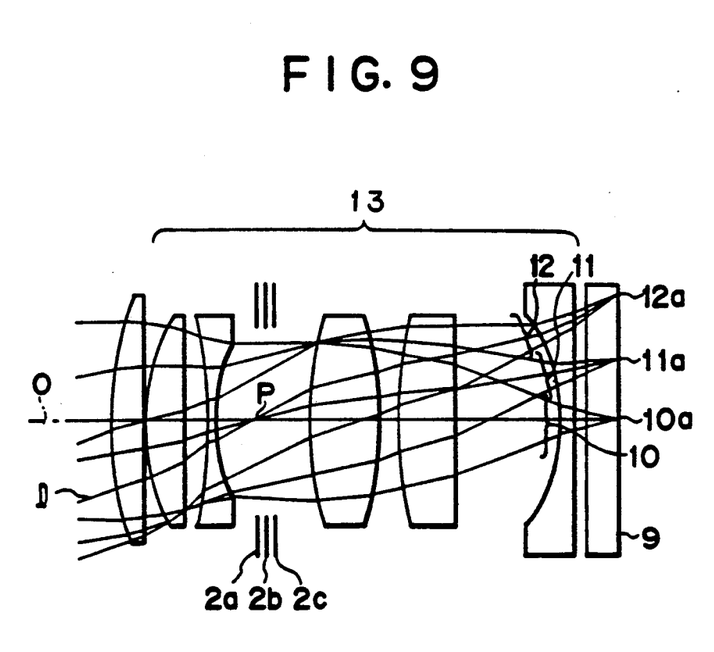
FIG. 9 is an outlined sketch of a critical portion of the third embodiment of this invention.

FIG. 9 is an outlined sketch of a critical portion of an optical system of the third embodiment of this invention.

Figure 10:
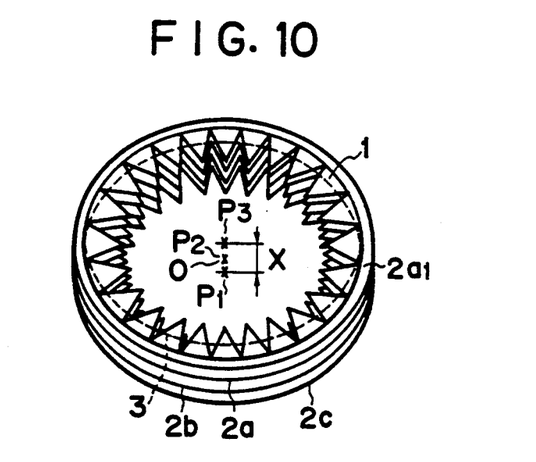
FIGS. 10, 11 and 12 are a cross view, a front view and a side view respectively of the light blocking plates of the third embodiment of this invention.
Figure 11:
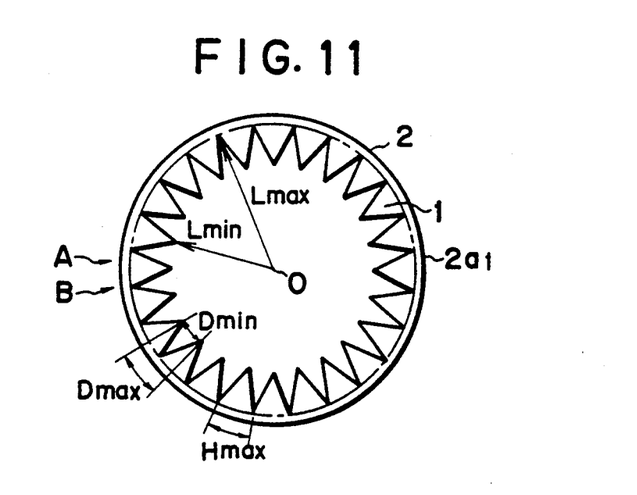
Figure 12:
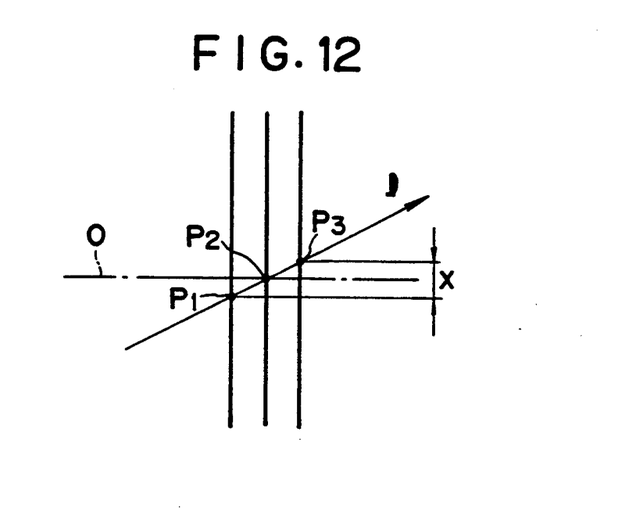

In the figure thereof, 13 is a lens system and 2a, 2b and 2c are light blocking plates, respectively. In this embodiment, the light blocking plates 2a, 2b and 2c are arranged at a roughly equal space along the optical axis 0, nearby a point P, where the off-axis principal ray 1 crosses the optical axis 0 in said lens system 13. The three light blocking plates of 2a, 2b and 2c are hereinafter referred to as light blocking plates 2'. FIG. 10 is a cross view of the three light blocking plates 2a, 2b and 2c in FIG. 9 seen at approximately 30 degrees below the optical axis 0. FIG. 11 is an outlined sketch of three blocking plates 2a, 2b and 2c seen from the front of incidence in the lens system 13. FIG. 12 is a side view of a critical portion when proximity of three light blocking plates of 2a, 2b and 2c is seen at 90 degrees off the optical axis 0. In this embodiment, a plurality of light blocking areas aligned in the direction of the optical axis are arranged in a ring shape.

In this embodiment, light blocking plates 2' comprise a plurality of light blocking elements 1 in a triangular shape that are equally spaced and radially projecting from the peripheral of ring-shaped members $2a_l$ toward the center 0 of the circle as shown in FIGS. 10 and 11. In this way in this embodiment and the following embodiments the light blocking elements are so constructed that the area of the plane 90 degrees off the optical axis becomes considerably larger than that of the plane including the optical axis. (In the figures thereof, 24 pieces of light blocking elements 1 are equally spaced respectively on the circumference, but the light blocking elements 1 may be spaced at different distances, or the shape or size of each the light blocking element 1 may be different from one to another. Likewise, a plurality of the light blocking plates may not have to be minutely spaced equally, and the number of the light blocking plates can be in any quantity, provided the number is more than one.)

As indicated in FIG. 11, where the longest distance from convex/concave parts of light blocking element 1 to the circle center 0 is Lmax; and the shortest distance thereof is Lmin, the following condition is satisfied:

$$0.6 < Lmin/Lmax < 0.9 \quad (1)$$

It is not preferred to shorten a convex part of a light blocking element 1 excessively beyond the upper limit of the conditional equation (1) because such a short convex part causes only a small amount of sagittal peripheral fluxes to be blocked. On the other hand, lengthening a convex part of a light blocking element 1 excessively beyond the lower limit causes sagittal peripheral fluxes to be blocked to a great extent, but is not preferred because such a long convex part also causes valid tangential peripheral fluxes to be blocked thus decreasing the peripheral light amount.

In this embodiment, the condition is set so as to satisfy the following equation.

$$Lmin/Lmax = 0.7$$

Light blocking plates 2a, 2b and 2c are so arranged that the light blocking plates are observed as if they were one light blocking plate, as shown in FIG. 11, as each light blocking element 1 overlaps each other when seen from the front of incidence. As a result, the amount of the on-axis flux to be blocked becomes smaller. Also, arrangements are so done as indicated in FIG. 10, when the pupil of incidence in the lens system 13 is seen from the maximum field angle, that sagittal peripheral fluxes can be more effectively blocked.

In this embodiment, the increase in the F number of the lens system 13 as a result of the installation of the light blocking plates is approximately 19%. This does not pose much trouble.

In this embodiment, in order to most effectively block the amount of sagittal peripheral fluxes at the optical axis end, a plurality of light blocking plates should better be spaced at an equal distance so that the following equation can be established:

$$0.7 \cdot (N-1)/N \cdot Dmin \leq X \quad (2)$$

where Dmin is the distance between the tips of two neighboring light blocking elements 1 as indicated in FIG. 11; X is the distance, in the vertical direction to the optical axis, between $P^1$ and $P^3$ where the principal ray 1 at the maximum field angle crosses the blocking plates 2a and 2c respectively on a plane including the optical axis and the tips of the light blocking elements 1 respectively of the light blocking plate 2a nearest to the object to be photographed and the other light blocking plate 2c nearest to the image surface out of three light blocking plates 2a, 2b and 2c arranged along the optical axis 0 as shown in FIG. 12; and N is the number of the blocking plates.

Also, in order to effectively block, out of sagittal peripheral fluxes, the fluxes opposite to the optical axis (at the right and left edges of the pupil of incidence), it is preferred to satisfy the following conditional equation:

$$Dmax/N \leq Hmax \quad (3)$$

where on the circumference having radius equal to Lmax that is the longest distance from the circumferential center 0 (corresponding to the optical axis 0) of the ring-shaped member $2a_l$ of the light blocking plate 2' to the light blocking element 1 as shown in FIG. 12, Dmax is the distance between the centers of two neighboring light blocking elements 1; Hmax is the width of the light blocking element 1 at the circumferential end; and N is the number of the light blocking plates arranged along the optical axis with a plurality of light blocking elements provided. (In this embodiment, N is set at 3.)

Figure 13:
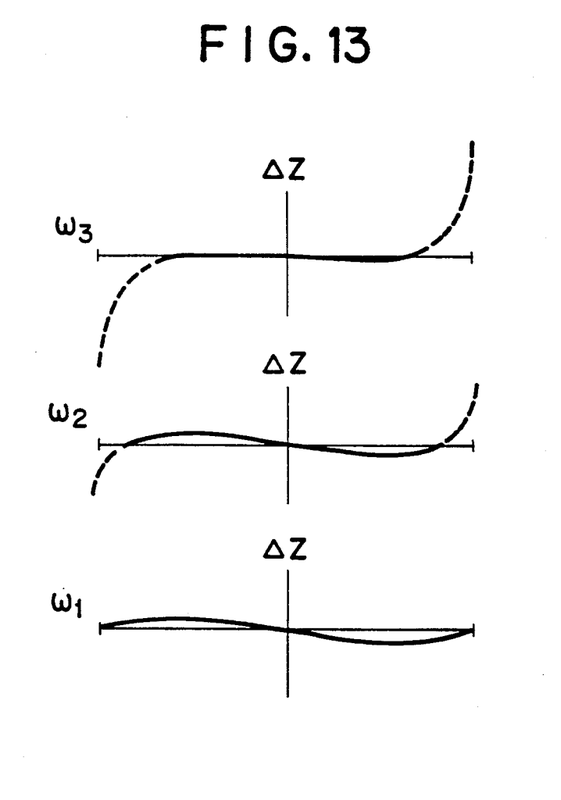
FIG. 13 is an explanatory view showing a light blocked area out of $\Delta Z$ of sagittal light elements of traverse aberration.

In this embodiment, a plurality of light blocking plates, in the structure as aforementioned, are installed at a predetermined position in a lens system, whereby for example, as shown in FIG. 13, out of the amount of transverse aberrations ΔZ, the on-axis flux (at field angle $\omega^1 = 0°$) is blocked less while, out of off-axis fluxes, sagittal peripheral fluxes (indicated in a dotted line) at greater field angles (at field angle $\omega = \omega^2, \omega^3$) are effectively blocked. Namely, sagittal flares are removed, thereby improving the optical performance of the whole field.

Figure 14:
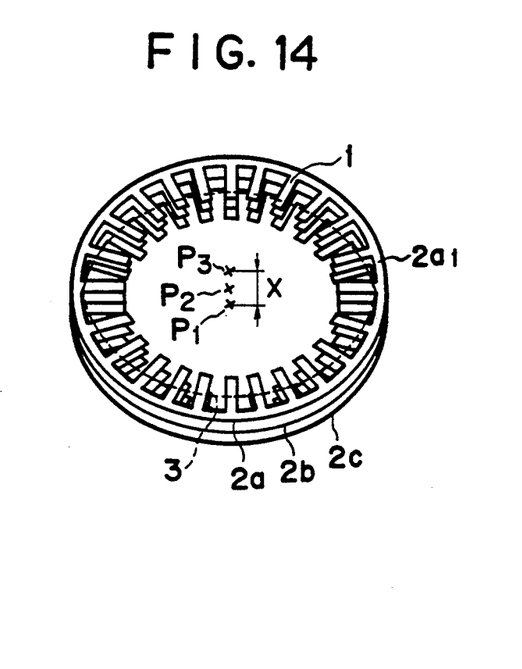
FIGS. 14, 15 and 16 are a cross view, a front view and a side view respectively of the light blocking plates of the fourth embodiment of this invention.
Figure 15:
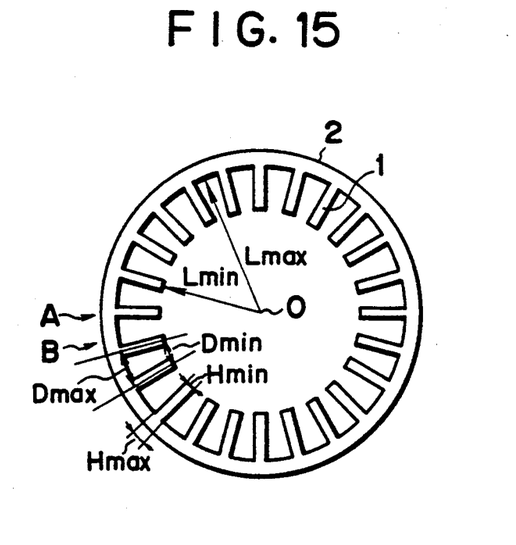
Figure 16:
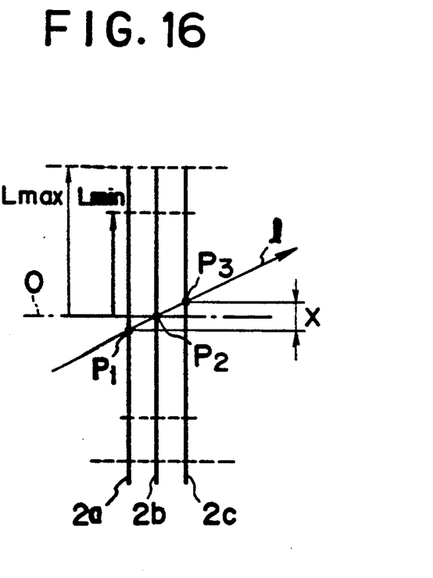

FIG. 14 is a cross view of a critical portion of the fourth embodiment of this invention when light blocking plates only are extracted, and FIG. 15 is an outlined sketch thereof seen from the front of incidence in a lens system. FIG. 16 is a side view of proximity of the light blocking plates in FIG. 14 seen at 90 degrees off the optical axis. FIGS. 14, 15 and 16 corresponds to FIGS. 10, 11 and 12, respectively.

In this embodiment, the shape of the light blocking element 1 is made in a rectangular shape, a plurality of which are periodically arranged on the circumference of the ring-shaped member $2a_l$, comprising the light blocking plate 2'. Thereby the light blocking ratio for the on-axis flux is decreased while that for sagittal peripheral fluxes of off-axis fluxes is increased.

When the configurational sizes of a light blocking element 1 are specified as indicated in FIGS. 14 and 15, various conditions for the shape of the light blocking element 1 are the same as those for the third embodiment as indicated in FIGS. 10 through 12.

For example, Lmin/Lmax=0.7, and the aforesaid conditional equations (2) and (3) are satisfied:

$$0.7 \cdot (N-1)/N \cdot Dmin \leq X$$

$$Dmax/N \leq Hmax$$

Like the ones in the third embodiment, the neighboring light blocking plates 2a, 2b and 2c in this embodiment have the same light blocking element 1 in length where the light blocking element is extended within a plane 90 degrees off the optical axis as indicated in FIG. 16.

The increase ratio of the F number thereof is approximately 10%, representing less loss in the F number compared with aforesaid triangular shape (fan-shaped projected part) in the first embodiment.

In this embodiment as indicated in FIG. 15, the following equation can be established:

$$Hmin = Hmax$$

Where Hmin is the tip width of a light blocking element 1; and Hmax is the width of the light blocking element 1 on a circumference having a radius equal to a distance Lmax.

On the other hand, a plurality of light blocking plates with trapezoidal light blocking elements arranged at an equal angle and space on a circumference, may be installed at an equal distance along the optical axis, provided that the following condition can be satisfied:

$$Dmax/Hmax = Dmin/Hmin = N$$

Where N is the number of the light blocking plates.

It is preferred to follow the aforesaid installation in that thereby the light blocking ratio for the on-axis flux is at the minimum while at the same time, sagittal peripheral fluxes of off-axis fluxes can be blocked in the highest amount.

Figure 17:
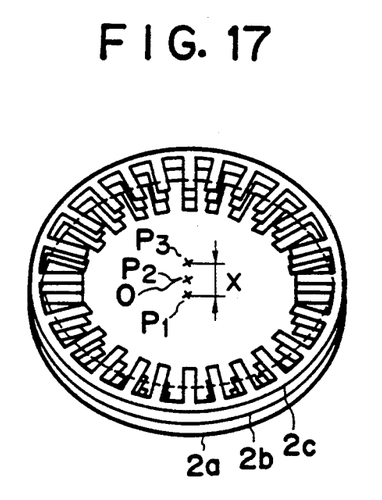
FIGS. 17, 18 and 19 are a cross view, a front view and a side view respectively of the fourth embodiment of this invention.
Figure 18:
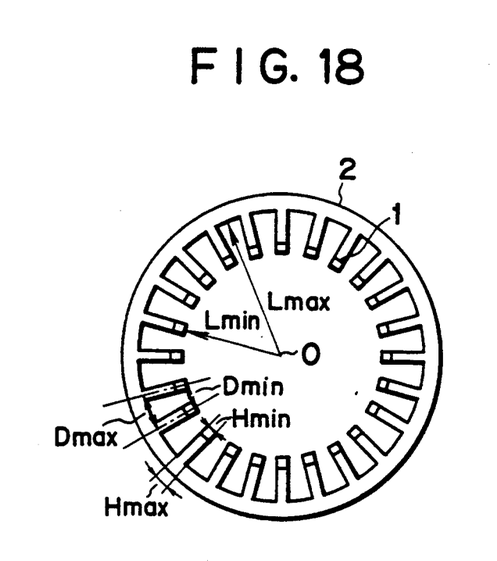
Figure 19:
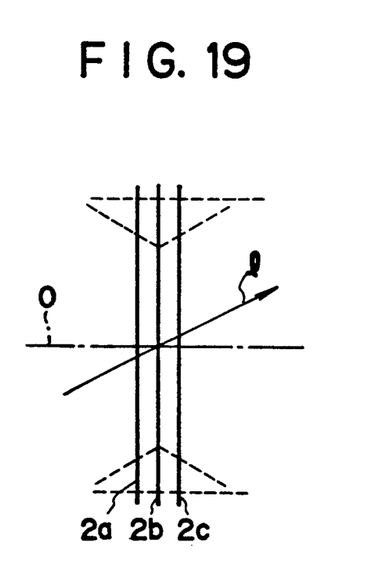

In this embodiment as indicated in FIGS. 17, 18 and 19, the length, toward the circumferential center 0, of light blocking elements 1 may be differed from one to another. Thereby the light blocking ratio for tangential peripheral fluxes out of off-axis fluxes can be held lower while sagittal peripheral fluxes can be blocked effectively.

FIGS. 17, 18 and 19 correspond to FIGS. 10, 11 and 12, respectively.

Figure 20:
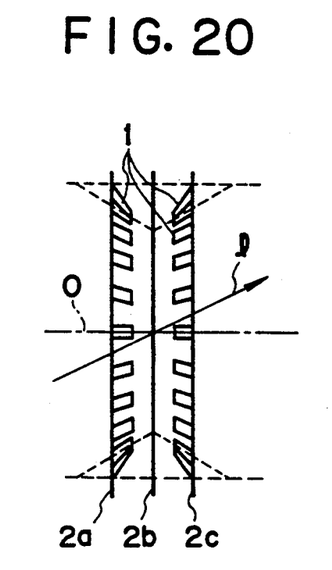
FIGS. 20, 21 and 22 are side views respectively of other embodiments of the light blocking plates of the fifth embodiment.
Figure 21:
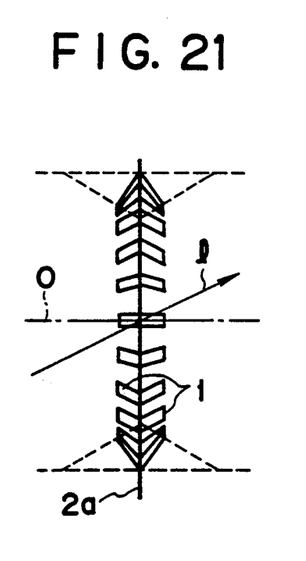
Figure 22:
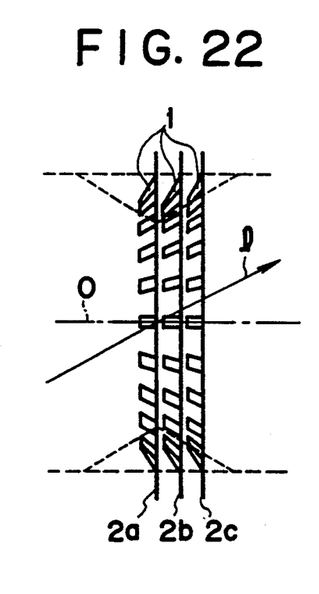

In this embodiment as indicated in FIGS. 20, 21 and 22 (respectively corresponding to FIG. 12), blocking plates may be so constructed that projected elements of light blocking elements 1 thereof are inclined to a plane 90 degrees off the optical axis, by a fixed angle or angles set differently by light blocking elements.

Thereby the light blocking ratio for tangential peripheral fluxes can be decreased while sagittal peripheral fluxes can be blocked effectively.

When an installation space for blocking plates is limited, the limit can be eliminated by constructing light blocking elements 1, for example, as indicated in FIGS. 21 and 22.

According to this invention, by arranging at a prescribed position in a lens system, a plurality of light blocking plates with light blocking elements in a prescribed shape provided as aforesaid, the amount of the on-axis flux to be blocked can be made smaller while sagittal peripheral fluxes of off-axis fluxes can be blocked effectively. Such an arrangement achieves a lens system, equipped with light blocking plates, of a large diameter ratio and a wide field angle having a high optical performance over the whole field, the lens system being suitable for photo-taking lenses for photo-taking cameras and video cameras and projection lenses for projectors.

We claim:

1. An optical apparatus comprising:
   a plurality of optical lenses provided on an optical axis; and
   a plurality of light blocking plates for eliminating harmful light fluxes, said light blocking plates being inclined to a plurality of imaginary planes including said optical axis, by an angle $\alpha$, respectively.

2. An optical apparatus according to claim 1, wherein said harmful light fluxes are mainly sagittal peripheral light fluxes and optical characteristic of said apparatus satisfies a condition of:

$$D > 2 \cdot L \sin(\pi/N) \cdot \cos\omega/\tan\omega$$

where
   L is the longest distance from the optical axis to each of said light blocking plates;
   D is the length of each of said light blocking plates along the optical axis;
   $\omega$ is an angle that a principal ray of the sagittal light fluxes makes with the optical axis; and
   N is the number of said light block plates.

3. An optical apparatus according to claim 1, further comprising a plurality of light blocking plates inclined by an angle $-\beta$ to a plurality of said imaginary planes respectively where said blocking plates inclined by said angle $\alpha$ and said blocking plates inclined by said angle $-\beta$ form a plurality of roof-shaped structures.

4. An optical apparatus according to claim 1, wherein said plurality of said blocking plates are located in proximity of the pupil position of said optical lenses.

5. An optical apparatus comprising:
   a plurality of optical lenses provided on an optical axis; and
   a plurality of projected elements extended toward said optical axis from a circumference away from said optical axis and aligned toward said optical axis, wherein said projected elements have a predetermined area in an imaginary plane, which is perpendicular to said optical axis, and said projected elements existing in a plural number within a circular area with said optical axis being the center.

6. An optical apparatus according to claim 5, wherein each of said projected elements blocks harmful sagittal rays.

7. An optical apparatus according to claim 6, satisfying a condition of:

$$0.6 < Lmin/Lmax < 0.9$$

where

Lmax is the longest distance from said optical axis to each said projected element; and Lmin is the shortest distance from said optical axis to said projected element.

8. An optical apparatus according to claim 5, satisfying a condition of:

$$0.7 \cdot (N-1)/N \cdot Dmin \leq X$$

where

Dmin is the shortest distance between the tops of two neighboring projected elements out of a plurality of projected elements arranged circumferentially, where N is the number of said projected elements; and X is a distance, when projected in the vertical direction from said optical axis, between two points where the principal ray at the maximum field angle of said optical lenses crosses the front-end and back-end projected elements respectively on a plane including the optical axis and the tips of the front-end and back-end projected elements arranged toward the optical axis.

9. An optical apparatus according to claim 5, wherein each of said projected elements is made in such a polygon that the nearer the on-axis flux is toward the optical axis, the smaller the amount of the on-axis flux to be blocked becomes.

10. An apparatus according to claim 9, wherein said polygon is in a triangle shape.

11. An optical apparatus according to claim 5, wherein each of said projected elements forms a polygon having a predetermined area on said imaginary plane perpendicular to said optical axis.

12. An optical apparatus according to claim 11, wherein said polygon is in a triangle shape.

13. An optical apparatus according to claim 11, wherein said polygon is in a rectangle shape.

* * * * *

UNITED STATES PATENT AND TRADEMARK OFFICE
CERTIFICATE OF CORRECTION

PATENT NO. : 5,210,645
DATED : May 11, 1993
INVENTOR(S) : KANJO ORINO, ET AL.

It is certified that error appears in the above-indentified patent and that said Letters Patent is hereby corrected as shown below:

TITLE PAGE:
[57] ABSTRACT
    line 3, "member" should read --members--.

COLUMN 1
    line 8, ", out" should read --out,--;
    line 25, "peripheral" should read --periphery--;
    line 44, "from" should read --of--;
    line 54, "peripheral" should read --periphery--; and
    line 64, "thereof" should read --same--.

COLUMN 2
    line 12, "cross" should read --perspective--;
    line 26, "cross" should read --perspective--;
    line 29, "cross" should read --perspective--;
    line 35, "cross" should read --perspective--;
    line 38, "cross" should read --perspective--;
    line 48, "alight" should read --a light--;
    line 49, "cross" shold read --perspective--;
    line 61, "rough" should read --a rough--; and
    line 65, "block" should read --black--.

COLUMN 3
    line 29, "peripheral" should read --periphery--.

COLUMN 4
    line 10, "aberration amount" should read --amount of aberration--; and
    line 37, "cross" should read --perspective--.

UNITED STATES PATENT AND TRADEMARK OFFICE
CERTIFICATE OF CORRECTION

PATENT NO. : 5,210,645
DATED : May 11, 1993           Page 2 of 2
INVENTOR(S) : KANJO ORINO, ET AL.

It is certified that error appears in the above-indentified patent and that said Letters Patent is hereby corrected as shown below:

COLUMN 5
    line 15, "cross" should read --perspective--;
    line 28, "peripheral" should read --periphery-- and "$2a_\ell$" should read --$2a_1$--; and
    line 38, "the" (second occurrence) should be deleted.

COLUMN 6
    line 45, "$2a_\ell$" should read --$2a_1$--; and
    line 65, "cross" should read --perspective--.

COLUMN 7
    line 8, "$2a_\ell$" should read --$2a_1$--; and
    line 9, "Thereby" should read --Thereby,--.

COLUMN 8
    line 45, "ωis" should read --ω is--; and
    line 47, "block" should read --blocking--.

Signed and Sealed this

Thirty-first Day of May, 1994

Attest:

BRUCE LEHMAN

Attesting Officer    Commissioner of Patents and Trademarks